(12) United States Patent
Peters et al.

(10) Patent No.: US 10,221,714 B2
(45) Date of Patent: Mar. 5, 2019

(54) SECONDARY SEAL DEVICE(S) WITH ALIGNMENT TAB(S)

(71) Applicant: United Technologies Corporation, Hartford, CT (US)

(72) Inventors: Christopher J. Peters, West Hartford, CT (US); Dave J. Hyland, Portland, CT (US)

(73) Assignee: United Technologies Corporation, Farmington, CT (US)

( * ) Notice: Subject to any disclaimer, the term of this patent is extended or adjusted under 35 U.S.C. 154(b) by 344 days.

(21) Appl. No.: 15/004,556

(22) Filed: Jan. 22, 2016

(65) Prior Publication Data
US 2017/0211402 A1 Jul. 27, 2017

(51) Int. Cl.
*F01D 11/04* (2006.01)
*F01D 5/02* (2006.01)
(Continued)

(52) U.S. Cl.
CPC .............. *F01D 11/04* (2013.01); *F01D 5/02* (2013.01); *F01D 9/02* (2013.01); *F01D 11/025* (2013.01);
(Continued)

(58) Field of Classification Search
CPC ........ F16J 15/441; F16J 15/442; F16J 15/002; F16J 15/54; F04D 29/10; F04D 29/12; F04D 29/122; F04D 29/083
See application file for complete search history.

(56) References Cited

U.S. PATENT DOCUMENTS 4,405,134 A 9/1983 Sargent et al.
4,426,087 A * 1/1984 Sargent .................. F16J 15/441
277/422

(Continued)

FOREIGN PATENT DOCUMENTS

CA 2403664 7/2007
CA 2536362 2/2013
(Continued)

OTHER PUBLICATIONS

EP search report for EP17152602.3 dated May 24, 2017.

*Primary Examiner* — Richard A Edgar
*Assistant Examiner* — Danielle M. Christensen
(74) *Attorney, Agent, or Firm* — O'Shea Getz P.C.

(57) ABSTRACT

An assembly is provided for rotational equipment with an axial centerline. This assembly includes a primary seal device, a ring structure and a secondary seal device. The primary seal device is configured as a hydrostatic non-contact seal device. The primary seal device includes a plurality of seal shoes and a seal base. The seal shoes are arranged circumferentially about the axial centerline in an annular array. The seal base circumscribes the annular array of the seal shoes. The ring structure is axially engaged with the seal base. The secondary seal device is mounted with the ring structure. The secondary seal device includes a seal ring body and an alignment tab. The seal ring body is configured to substantially seal an annular gap between the ring structure and the seal base. The alignment tab projects out from the seal ring body and into an aperture in the ring structure. The alignment tab is adapted to substantially rotationally locate and/or fix the secondary seal device to the ring structure.

20 Claims, 11 Drawing Sheets

(51) Int. Cl.
*F01D 9/02* (2006.01)
*F16J 15/44* (2006.01)
*F01D 11/02* (2006.01)

(52) U.S. Cl.
CPC ......... *F16J 15/442* (2013.01); *F05D 2220/30* (2013.01)

(56) References Cited

U.S. PATENT DOCUMENTS

| | | | | |
|---|---|---|---|---|
| 5,042,823 | A * | 8/1991 | Mackay | ................ F01D 11/02 277/355 |
| 8,172,232 | B2 | 5/2012 | Justak | |
| 8,641,045 | B2 | 2/2014 | Justak | |
| 8,919,781 | B2 * | 12/2014 | Justak | ................ F01D 11/025 277/411 |
| 2012/0112415 | A1 * | 5/2012 | Benjamin | ............ F01D 11/003 277/303 |
| 2016/0010480 | A1 | 1/2016 | Bidkar et al. | |
| 2016/0069269 | A1 | 3/2016 | Hyland et al. | |
| 2016/0109025 | A1 | 4/2016 | McCaffrey et al. | |

FOREIGN PATENT DOCUMENTS

| | | |
|---|---|---|
| CA | 2675597 | 5/2015 |
| EP | 2279364 | 5/2009 |
| EP | 2137383 | 12/2009 |
| EP | 2279364 | 2/2011 |
| EP | 2286119 | 2/2011 |
| EP | 2665897 | 11/2013 |
| EP | 2137383 | 12/2013 |
| WO | 2014150825 | 9/2014 |

* cited by examiner

SECONDARY SEAL DEVICE(S) WITH ALIGNMENT TAB(S)

This invention was made with government support under Contract No. FA8650-09-D-2923-AETD awarded by the United States Air Force. The government may have certain rights in the invention.

BACKGROUND OF THE INVENTION

1. Technical Field

This disclosure relates generally to rotational equipment and, more particularly, to a non-contact seal assembly for rotational equipment.

2. Background Information

Rotational equipment typically includes one or more seal assemblies for sealing gaps between rotors and stators. A typical seal assembly includes a contact seal with a seal element such as a knife edge seal that engages a seal land. Such a contact seal, however, can generate a significant quantity of heat which can reduce efficiency of the rotational equipment as well as subject other components of the rotational equipment to high temperatures and internal stresses. To accommodate the high temperatures and stresses, certain components of the rotational equipment may be constructed from specialty high temperature materials, which can significantly increase the manufacturing and servicing costs as well as the mass of the rotational equipment. While non-contact seals have been developed in an effort to reduce heat within rotational equipment, certain components of such non-contact seals can be difficult to assemble as well as be subject to relatively high stress concentrations during operation.

There is a need in the art for improved seal assemblies for rotational equipment.

SUMMARY OF THE DISCLOSURE

According to an aspect of the present disclosure, an assembly is provided for rotational equipment with an axial centerline. This assembly includes a primary seal device, a ring structure and a secondary seal device. The primary seal device is configured as a hydrostatic non-contact seal device. The primary seal device includes a plurality of seal shoes and a seal base. The seal shoes are arranged circumferentially about the axial centerline in an annular array. The seal base circumscribes the annular array of the seal shoes. The ring structure is axially engaged with the seal base. The secondary seal device is mounted with the ring structure. The secondary seal device includes a seal ring body and an alignment tab. The seal ring body is configured to substantially seal an annular gap between the ring structure and the seal base. The alignment tab projects out from the seal ring body and into an aperture in the ring structure. The alignment tab is adapted to substantially rotationally locate the secondary seal device to the ring structure.

According to another aspect of the present disclosure, another assembly is provided for rotational equipment with an axial centerline. This assembly includes a primary seal device, a ring structure and a secondary seal device. The primary seal device is configured as a hydrostatic non-contact seal device. The primary seal device includes a plurality of seal shoes and a seal base. The seal shoes are arranged circumferentially about the axial centerline in an annular array. The seal base circumscribes the annular array of the seal shoes. The ring structure is axially engaged with the seal base. The ring structure includes a first surface and a second surface that laterally faces the first surface. The secondary seal device is mounted with the ring structure. The secondary seal device includes a seal ring body and an alignment tab. The seal ring body is configured to substantially seal an annular gap between the ring structure and the seal base. The alignment tab projects out from the seal ring body and is arranged circumferentially between the first surface and the second surface.

According to still another aspect of the present disclosure, another assembly is provided for a turbine engine with an axial centerline. This assembly includes a turbine engine stator structure, a turbine engine rotor structure and a seal assembly configured for forming a seal between the turbine engine stator structure and the turbine engine rotor structure. The seal assembly includes a primary seal device, a ring structure and a secondary seal device. The primary seal device is configured as a hydrostatic non-contact seal device. The primary seal device includes a plurality of seal shoes and a seal base. The seal shoes are arranged circumferentially about the axial centerline in an annular array and sealingly engaged with the turbine engine rotor structure. The seal base circumscribes the annular array of the seal shoes and is engaged with the turbine engine stator structure. The ring structure is axially engaged with the seal base. The secondary seal device is mounted with the ring structure. The secondary seal device includes a seal ring body and an alignment tab. The seal ring body is configured to substantially seal an annular gap between the ring structure and the seal base. The alignment tab projects out from the seal ring body and into an aperture in the ring structure.

The ring structure may be configured with a notch that is partially formed by the first surface and the second surface.

The annular gap between the ring structure and the seal base may be fluidly coupled with a passage that extends axially through the primary seal device.

The primary seal device may include a plurality of spring elements that form the passage. Each of the spring elements may be radially between and connect a respective one of the seal shoes with the seal base.

The primary seal device may include a plurality of spring elements. Each of the spring elements may be radially between and connect a respective one of the seal shoes with the seal base.

The alignment tab may be a first alignment tab. The aperture may be a first aperture. The secondary seal device may include a second alignment tab that projects out from the seal ring body and into a second aperture in the ring structure. The second alignment tab may be adapted to substantially rotationally locate the secondary seal device to the ring structure.

The first alignment tab may have a first configuration and the second alignment tab may have a second configuration which is different than the first configuration.

The first alignment tab may have a first configuration and the second alignment tab may have a second configuration which is substantially the same as the first configuration.

The alignment tab may project radially out from an outer periphery of the seal ring body.

The secondary seal device may be configured as a split ring.

The secondary seal device may include a plurality cutouts arranged circumferentially about the axial centerline. A first of the cutouts may extend axially through the secondary seal device and partially radially into the secondary seal device.

A second secondary seal device may be included and mounted with the ring structure and configured as a split ring. The cutouts may be first cutouts. The second secondary seal device may include a plurality second cutouts arranged circumferentially about the axial centerline and offset from the first cutouts. A first of the second cutouts may extend axially through the second secondary seal device and partially radially into the second secondary seal device.

A second secondary seal device may be included and mounted with the ring structure. The second secondary seal device may include a second seal ring body and a second alignment tab. The seal ring body and the second seal ring body may be configured to substantially seal the annular gap between the ring structure and the seal base. The second alignment tab may project out from the second seal ring body and into the aperture in the ring structure. The second alignment tab may be adapted to substantially rotationally fix the second secondary seal device to the ring structure.

A second secondary seal device may be mounted with the ring structure. The second secondary seal device may include a second seal ring body and a second alignment tab. The seal ring body and the second seal ring body may be configured to substantially seal the annular gap between the ring structure and the seal base. The second alignment tab may project out from the second seal ring body and into a second aperture in the ring structure. The second alignment tab may be adapted to substantially rotationally fix the second secondary seal device to the ring structure.

The ring structure may include a secondary seal device support ring and a retention ring. The secondary seal device support ring may be axially engaged with and between the seal base and the retention ring. The retention ring may be configured to axially retain the secondary seal device with the secondary seal device support ring. The aperture may be formed in the secondary seal device support ring.

The ring structure may include a secondary seal device support ring and a retention ring. The secondary seal device support ring may be axially engaged with and between the seal base and the retention ring. The retention ring may be configured to axially retain the secondary seal device with the secondary seal device support ring. The aperture may be framed in the retention ring.

A stator structure, a rotor structure and a seal assembly may be included. The seal assembly may be configured for sealing an annular gap between the stator structure and the rotor structure. The seal assembly may include the primary seal device, the ring structure and the secondary seal device. The seal base may be engaged with the stator structure. The seal shoes may be sealingly engaged with the rotor structure.

The stator structure and the rotor structure may be configured within a turbine engine.

The foregoing features and the operation of the invention will become more apparent in light of the following description and the accompanying drawings.

DETAILED DESCRIPTION OF THE INVENTION

Figure 1:
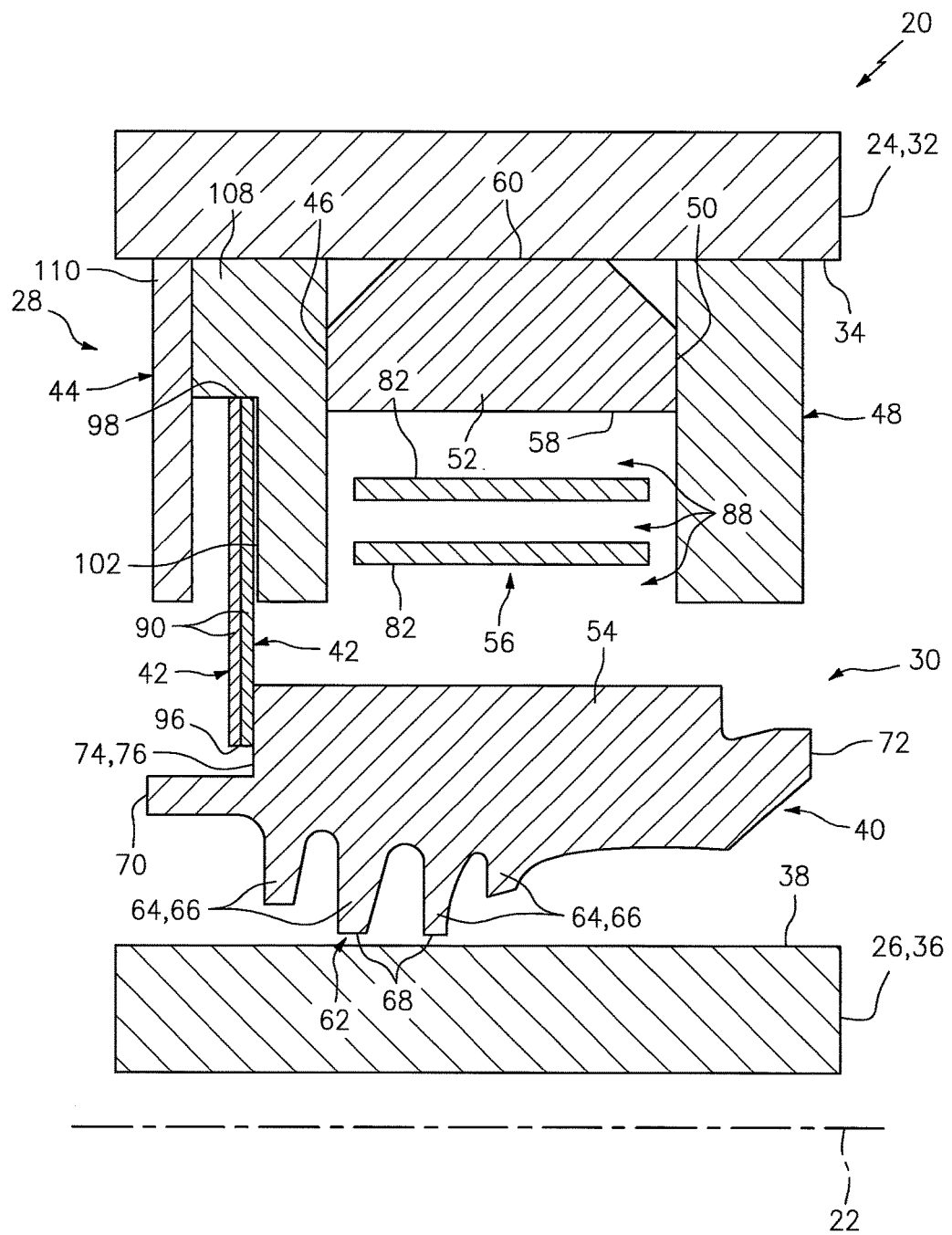
FIG. 1 is a top half side sectional illustration of an assembly for rotational equipment at a first angular position about a centerline.
Figure 2:
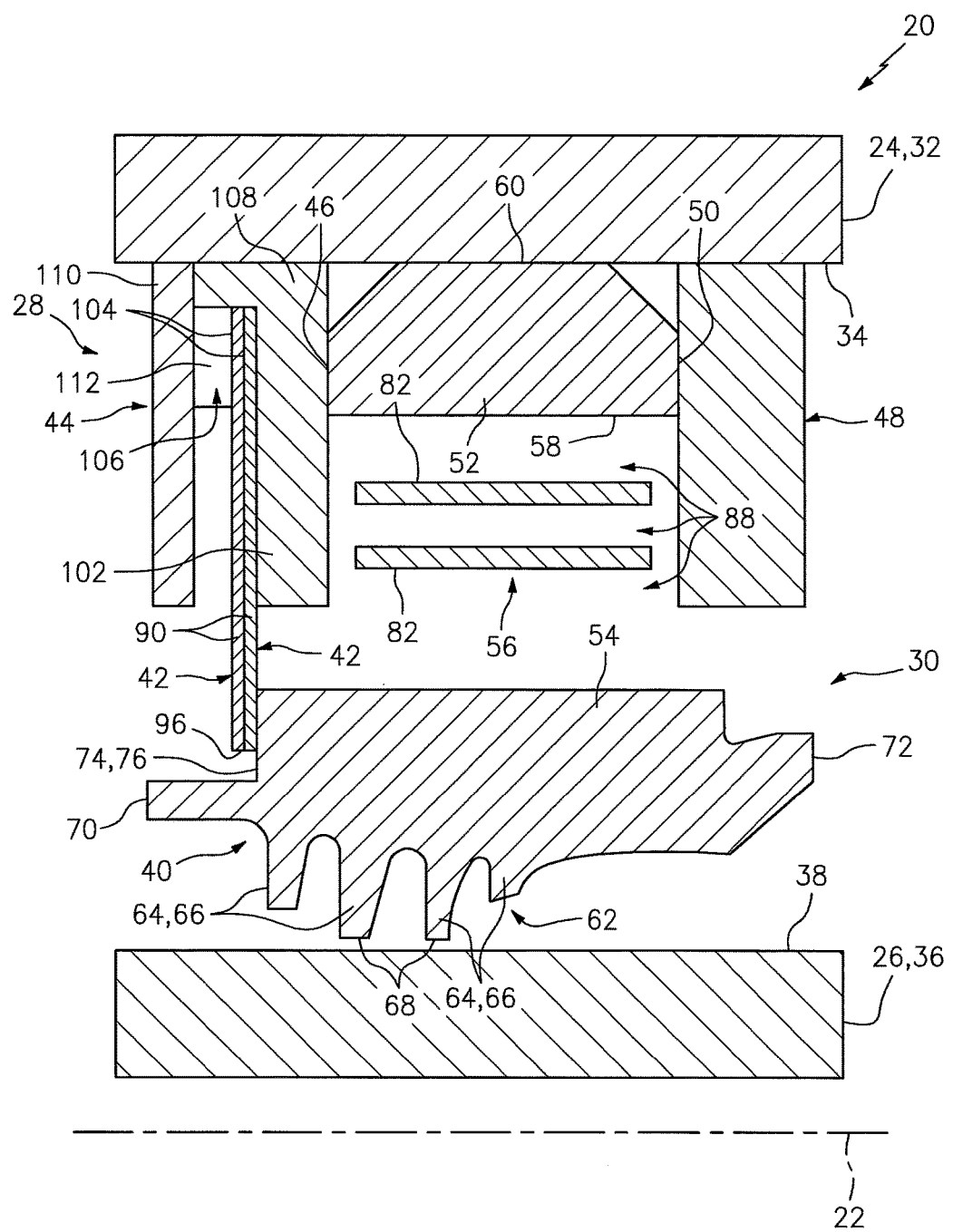
FIG. 2 is another top half side sectional illustration of the assembly at a second angular position about the centerline.

FIGS. 1 and 2 illustrate an assembly 20 for rotational equipment with an axial centerline 22. An example of such rotational equipment is a gas turbine engine for an aircraft propulsion system, an exemplary embodiment of which is described below in further detail. However, the assembly 20 of the present disclosure is not limited to such an aircraft or gas turbine engine application. The assembly 20, for example, may alternatively be configured with rotational equipment such as an industrial gas turbine engine, a wind turbine, a water turbine or any other apparatus in which a seal is provided between a stator structure and a rotor structure.

The assembly 20 of FIGS. 1 and 2 includes a stator structure 24, a rotor structure 26 and a seal assembly 28. This seal assembly 28 is mounted with the stator structure 24, and configured to substantially seal an annular gap 30 between the stator structure 24 and the rotor structure 26 as described below in further detail.

The stator structure 24 includes a seal carrier 32. This seal carrier 32 may be a discrete, unitary annular body. Alternatively, the seal carrier 32 may be configured with another component/portion of the stator structure 24. The seal carrier 32 has an inner radial seal carrier surface 34. This seal carrier surface 34 may be substantially cylindrical, and extends circumferentially around and faces towards the axial centerline 22. The seal carrier surface 34 at least partially forms a bore in the stator structure 24. This bore is sized to receive the seal assembly 28, which may be fixedly attached to the seal carrier 32 by, for example, a press fit connection between the seal assembly 28 and the seal carrier surface 34.

The rotor structure 26 includes a seal land 36. This seal land 36 may be a discrete, unitary annular body. Alternatively, the seal land 36 may be configured with another component/portion of the rotor structure 26. The seal land 36 has an outer radial seal land surface 38. This seal land surface 38 may be substantially cylindrical, and extends circumferentially around and faces away from the axial centerline 22. The seal land surface 38 is disposed to face towards and is axially aligned with the seal carrier surface 34. While FIGS. 1 and 2 illustrate the surfaces 34 and 38 with approximately equal axial lengths along the axial centerline 22, the seal land surface 38 may alternatively be longer or shorter than the seal carrier surface 34 in other embodiments.

The seal assembly 28 includes a primary seal device 40 and one or more secondary seal devices 42; e.g., 1, 2, 3 or more secondary seal devices 42. The seal assembly 28 also includes one or more additional components for positioning, supporting and/or mounting one or more of the seal devices 40 and 42 with the stator structure 24. The seal assembly 28 of FIGS. 1 and 2, for example, includes a first ring structure 44 configured for positioning, supporting and/or mounting the secondary seal devices 42 relative to the primary seal device 40. This first ring structure 44 may also be configured for axially positioning and/or supporting a first end surface 46 of the primary seal device 40 relative to the stator structure 24. The seal assembly 28 of FIGS. 1 and 2 also includes a second ring structure 48 (e.g., a scalloped support ring) configured for axially positioning and/or supporting a second end surface 50 of the primary seal device 40 relative to the stator structure 24. However, the second ring structure 48 may be omitted where, for example, the second end surface 50 of the primary seal device 40 may be abutted against another component/portion of the stator structure 24 (e.g., an annular or castellated shoulder) or otherwise axially positioned/secure with the stator structure 24.

Figure 3:
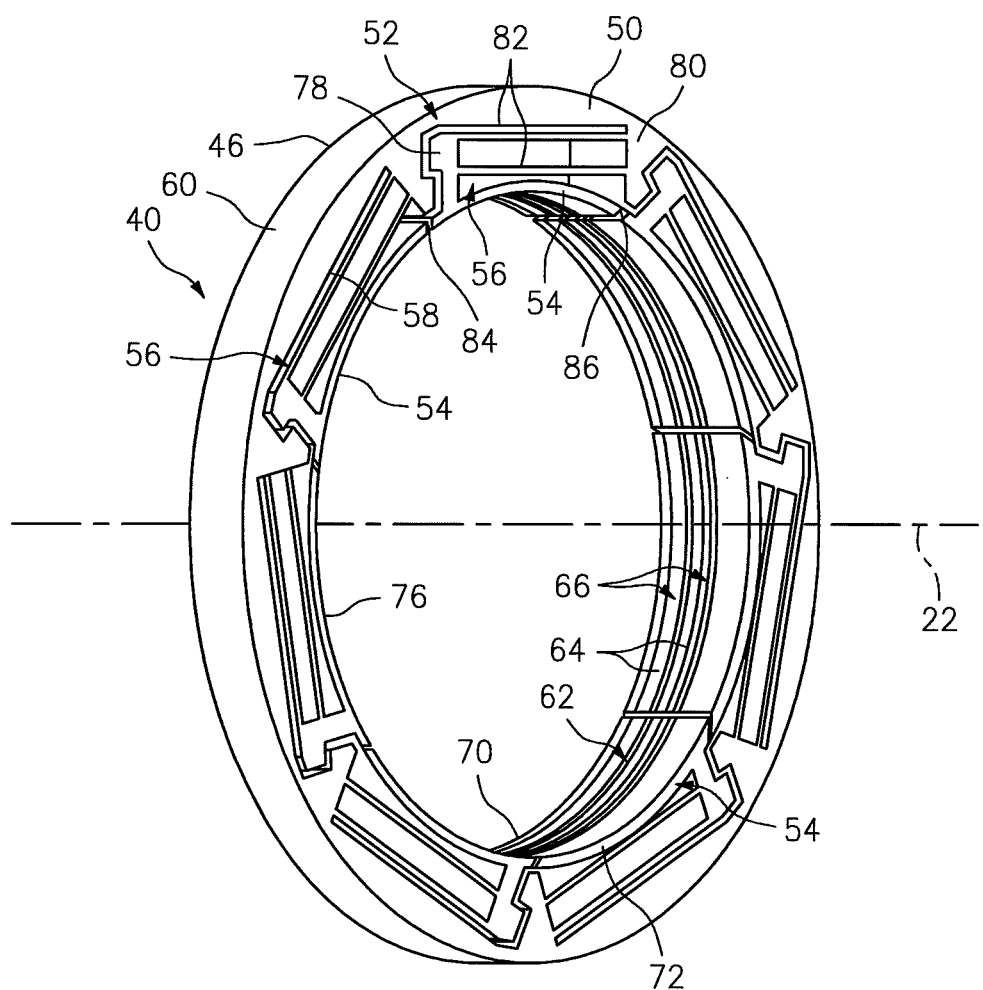
FIG. 3 is a perspective general representation of a primary seal device for an assembly.
Figure 4:
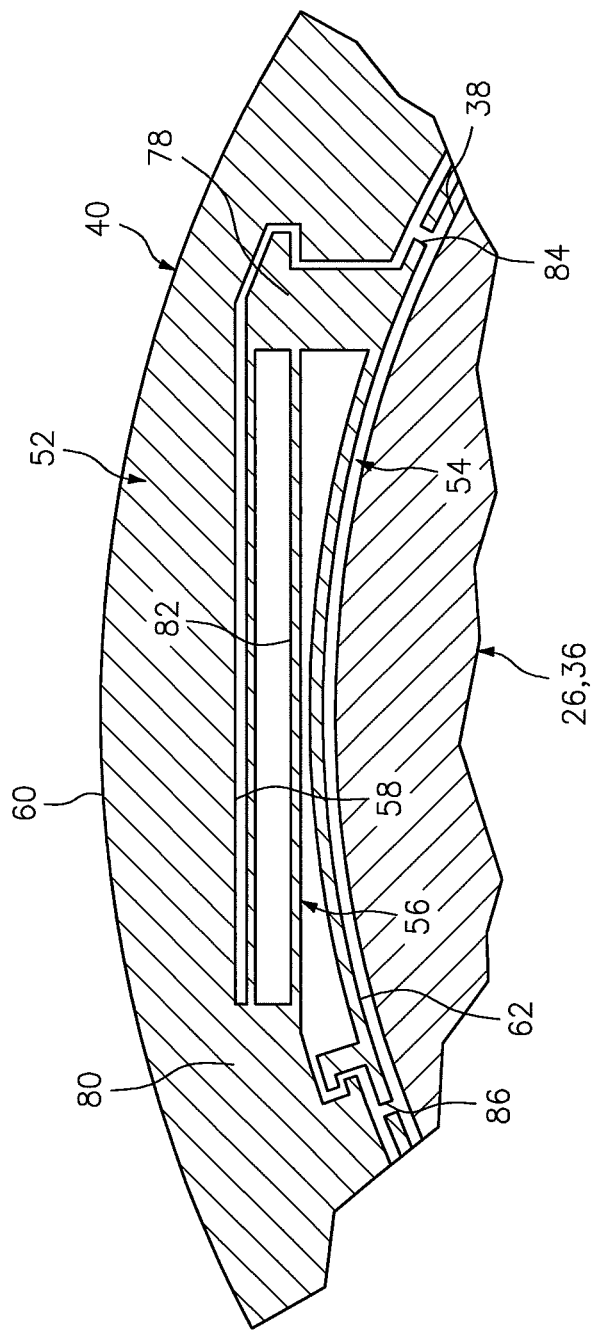
FIG. 4 is a partial cross-sectional illustration of the assembly.

Referring to FIG. 3, the primary seal device 40 is configured as an annular non-contact seal device and, more particularly, a hydrostatic non-contact seal device. An example of such a hydrostatic non-contact seal device is a "HALO™" seal; however, the primary seal device 40 of the present disclosure is not limited to the foregoing exemplary hydrostatic non-contact seal device.

Referring to FIGS. 1 to 4, the primary seal device 40 includes a seal base 52, a plurality of seal shoes 54 and a plurality of spring elements 56. The seal base 52 is configured as an annular full hoop body, which extends circumferentially around the axial centerline 22. The seal base 52 is configured to circumscribe the seal shoes 54 as well as the spring elements 56. The seal base 52 extends axially along the axial centerline 22 between and forms the first end surface 46 and the second end surface 50. The seal base 52 extends radially between an inner radial base side 58 and an outer radial base side 60, which radially engages (e.g., is press fit against) the stator structure 24 and, more particularly, the seal carrier surface 34.

The seal shoes 54 are configured as arcuate bodies arranged circumferentially about the axial centerline 22 in an annular array. This annular array of the seal shoes 54 extends circumferentially around the axial centerline 22, thereby forming an inner bore at an inner radial side 62 of the primary seal device 40. This inner bore is sized to receive the seal land 36, where the rotor structure 26 projects axially through (or into) the inner bore formed by the seal shoes 54.

Each of the seal shoes 54 includes one or more arcuate protrusions 64, which collectively form one or more (e.g., a plurality of axially spaced) generally annular (e.g., circumferentially segmented) ribs 66 at the inner radial side 62. Distal inner radial ends 68 of one or more of these ribs 66 are configured to be arranged in close proximity with (but not touch) and thereby sealingly engage the seal land surface 38 in a non-contact manner, where the rotor structure 26 project axially through (or into) the inner bore formed by the seal shoes 54. The ribs 66 therefore are configured, generally speaking, as non-contact knife edge seal elements.

Each of the seal shoes 54 extends axially along the axial centerline 22 between a first shoe end 70 and a second shoe end 72. Referring to FIGS. 1 and 2, the first shoe end 70 may be axially offset from and project axially away from the first end surface 46. The second shoe end 72 may be axially offset from and project axially away from the second end surface 50.

Each of the seal shoes 54 includes an arcuate end surface 74 generally at (e.g., on, adjacent or proximate) the first shoe end 70. In the array (see FIG. 3), these arcuate end surfaces 74 collectively form a generally annular (but circumferentially segmented) end surface 76 configured for sealingly engaging with the secondary seal devices 42 (see FIGS. 1 and 2) as described below in further detail. The seal shoes 54 of the present disclosure, however, are not limited to the foregoing exemplary configuration.

The spring elements 56 are arranged circumferentially about the axial centerline 22 in an annular array. The spring elements 56 are also arranged radially between the seal shoes 54 and the seal base 52. Each of the spring elements 56 is configured to connect a respective one of the seal shoes 54 with the seal base 52. The spring element 56 shown in FIG. 4, for example, includes one or more mounts 78 and 80 (e.g., generally radial fingers/projections) and one or more springs 82 (e.g., cantilever-leaf springs). The first mount 78 is connected to a respective one of the seal shoes 54 at (e.g., on, adjacent or proximate) its first circumferential side 84, where an opposing second circumferential side 86 of that seal shoe 54 is free floating. The second mount 80 is connected to the seal base 52, and is generally circumferentially aligned with or near the second circumferential side 86. The springs 82 are radially stacked and spaced apart with one another. Each of these springs 82 extends laterally (e.g., tangentially or circumferentially) from the first mount 78 to the second mount 80. These spring elements 56 may thereby laterally overlap a major circumferential portion (e.g., ~50-90%) of the seal shoe 54. The spring elements 56 of the present disclosure, however, are not limited to the foregoing exemplary configuration or values.

During operation of the primary seal device 40, aerodynamic forces may develop and apply a fluid pressure to each of the seal shoes 54 causing the respective seal shoe 54 to move radially relative to the seal land surface 38. The fluid velocity may increase as a gap between the seal shoe 54 and seal land surface 38 increases, thus reducing pressure in the gap and drawing the seal shoe 54 radially inwardly toward the seal land surface 38. As the gap closes, the velocity may decrease and the pressure may increase within the gap, thus, forcing the seal shoe 54 radially outwardly from the seal land surface 38. The respective spring element 56 may deflect and move with the seal shoe 54 to create a primary seal of the gap between the seal land surface 38 and ribs 66 within predetermined design tolerances.

While the primary seal device 40 is operable to generally seal the annular gap between the stator structure 24 and the rotor structure 26 as described above, fluid (e.g., gas) may still flow axially through passages 88 defined by radial gaps between the components 52, 54 and 56 (see FIGS. 1 and 2). The secondary seal devices 42 therefore are provided to seal off these passages 88 and, thereby, further and more completely seal the annular gap 30.

Figure 5A:
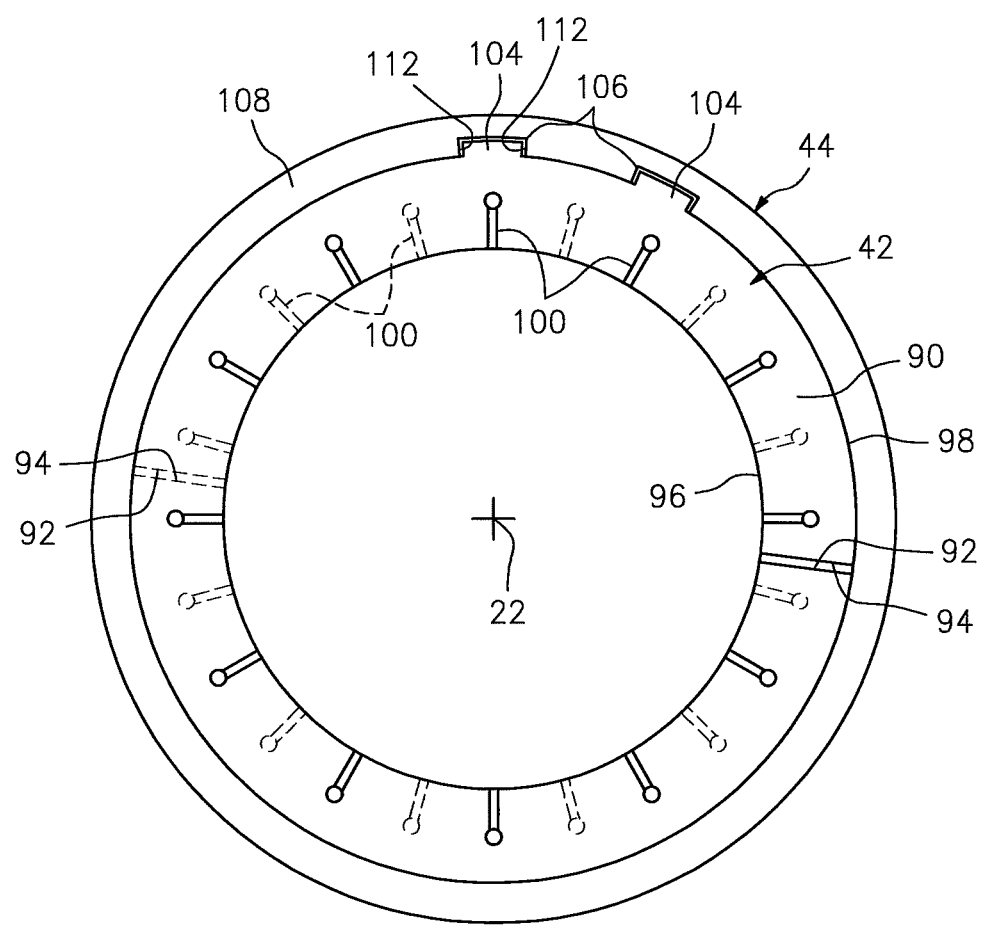
FIG. 5A is an end view illustration of secondary seal devices mounted with a ring structure for the assembly.

Referring now to FIGS. 1, 2 and 5A, each of the secondary seal devices 42 may be configured as a ring seal element such as, but not limited to, a split ring. The secondary seal device 42 of FIG. 5A, for example, is configured with a substantially annular full hoop seal ring body 90. This seal ring body 90 extends circumferentially partially (e.g., between ~350-360 degrees) around the axial centerline 22 between two opposing body ends 92 and 94. The seal ring body 90 extends axially between opposing generally annular side surfaces. The seal ring body 90 extends radially between opposing inner and outer peripheries 96 and 98.

The seal ring body 90 may include one or more cutouts 100 as shown in FIG. 5A (dashed lines show cutouts 100 in the secondary seal device 42 beneath the secondary seal device visible in FIG. 5A). These cutouts 100 may be configured with the seal ring body 90 to increase the compliance/flexibility of that secondary seal device 42. The cutouts 100 of FIG. 5A, for example, are arranged at discrete locations about the axial centerline 22. Each of the cutouts 100 may extend axially through the seal ring body 90, and partially radially up into the seal ring body 90 from the inner periphery 96. Each cutout 100 may have a "keyhole" type cross-sectional geometry as shown in FIG. 5A; however, the present disclosure is not limited to the foregoing exemplary cross-sectional geometry.

The secondary seal devices 42 are arranged together in an axial stack, where each of the secondary seal devices 42 axially engages (e.g., contacts) another adjacent one of the secondary seal devices 42. This stack of the secondary seal devices 42 is arranged with the first ring structure 44, which positions and mounts the secondary seal devices 42 with the stator structure 24 adjacent the primary seal device 40. In this arrangement, the stack of the secondary seal devices 42 is operable to axially engage and form a seal between the end surface 76 of the array of the seal shoes 54 and an annular surface 102 of the first ring structure 44. These surfaces 76 and 102 are axially aligned with one another, which enables the stack of the secondary seal devices 42 to slide radially against, but maintain sealingly engagement with, the end surface 76 as the seal shoes 54 move radially relative to the seal land surface 38 as described above. Of course, in other embodiments, the surfaces 76 and 102 may be axially offset where, for example, the stack of the secondary seal devices 42 is configured with a corresponding offset to maintain sliding engagement with the surfaces 76 and 102.

In the stacked arrangement, the secondary seal devices 42 may be rotationally clocked about the axial centerline 22 such that the cutouts 100 in one of the secondary seal devices 42 are circumferentially misaligned (e.g., angularly displaced) from the cutouts 100 in another adjacent one of the secondary seal devices 42 (shown by dashed lines in FIG. 5A). In this manner, fluid is substantially blocked from flowing across the secondary seal devices 42 through the cutouts 100.

Figure 5B:
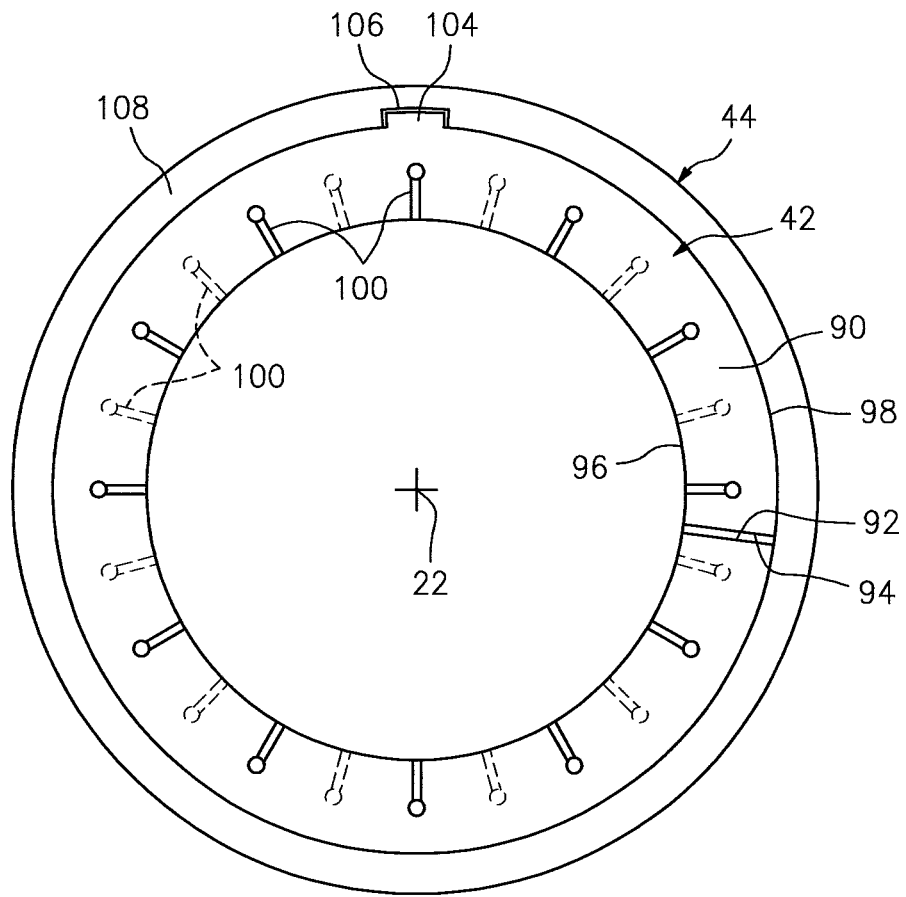
FIG. 5B is an end view illustration of alternative secondary seal devices mounted with an alternative ring structure for the assembly.

To enable proper arrangement of the secondary seal devices 42 relative to one another as described above and/or rotationally fix the devices 42, each of the secondary seal devices 42 includes one or more alignment tabs 104 as shown in FIGS. 2 and 5A; see also FIG. 5B. Each of these alignment tabs 104 may project radially out from the outer periphery 98 of the seal ring body 90 and into a respective aperture 106 (e.g., notch) in the first ring structure 44. In this manner, when each of the secondary seal devices 42 is arranged with the first ring structure 44 and its alignment tabs 104 are respectively mated with the apertures 106 in the first ring structure 44, that secondary seal device 42 will be at a predetermined rotational position as well as will be rotationally secured.

Figure 6:
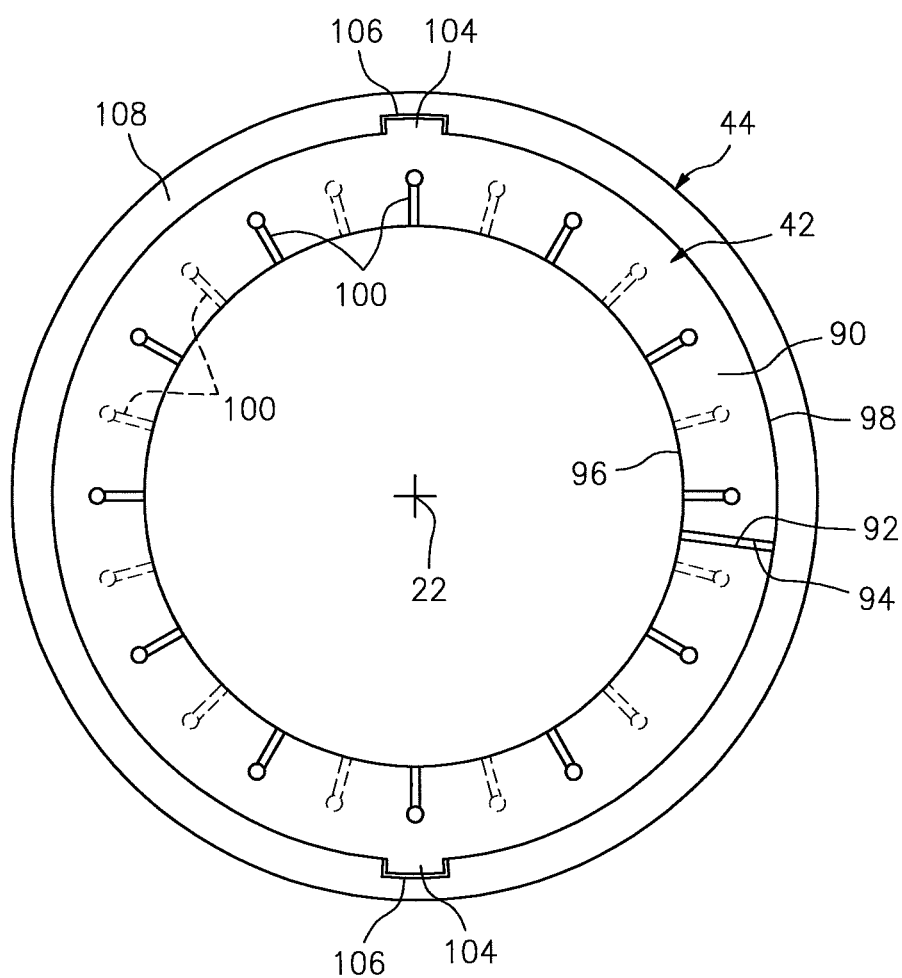
FIG. 6 is an end view illustration of alternative secondary seal devices mounted with an alternative ring structure for the assembly.
Figure 7:
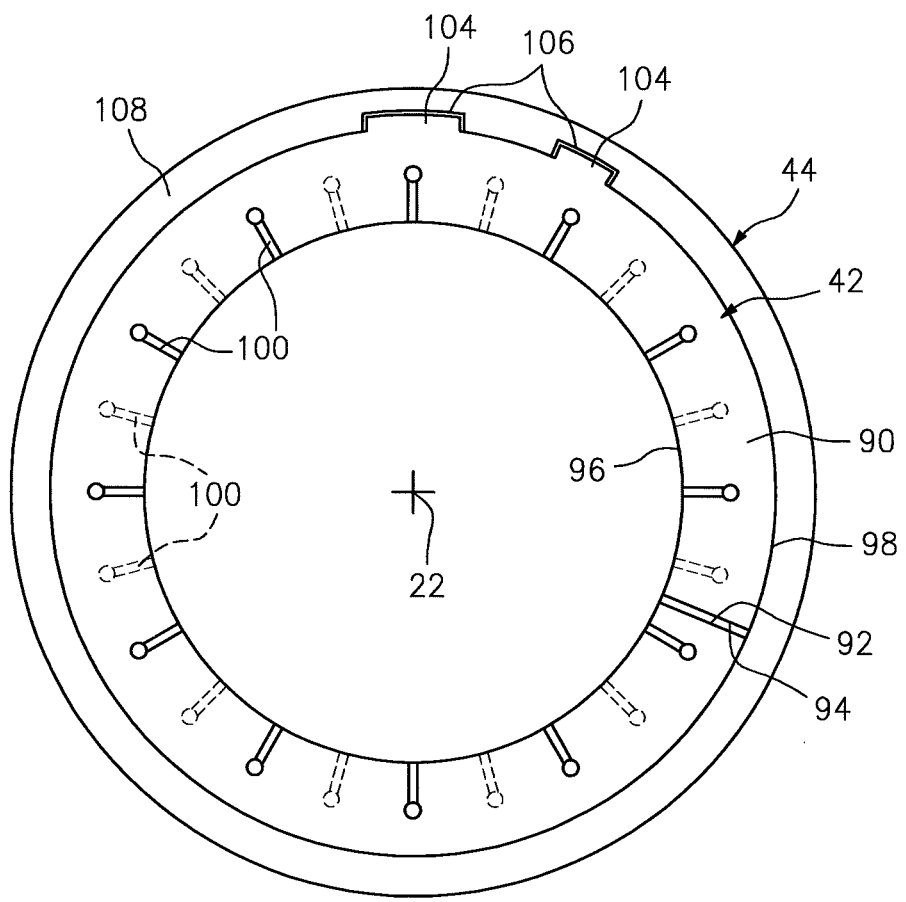
FIG. 7 is an end view illustration of other alternative secondary seal devices mounted with another alternative ring structure for the assembly.

The alignment tabs 104 may be arranged non-uniformly about the seal ring body 90 as shown in FIG. 5A, or uniformly about the seal ring body 90 as shown in FIG. 6. The alignment tabs 104 may have different configurations. The alignment tabs 104 of FIG. 7, for example, are configured with different sizes. Of course, the alignment tabs 104 may also or alternatively be configured with different geometries. This may further ensure the secondary seal devices 42 are properly installed with the first ring structure 44 where, for example, the apertures are configured to specifically match with certain ones of the alignment tabs 104. In other embodiments, the alignment tabs 104 may have substantially the same configuration as shown in FIG. 5A; e.g., the same size and geometry. This may enable each of the secondary seal devices 42 to have the same configuration. During assembly, however, one of the secondary seal devices 42 may be flipped around relative to the other so as to ensure circumferential misalignment between the cutouts 100.

Figure 8A:
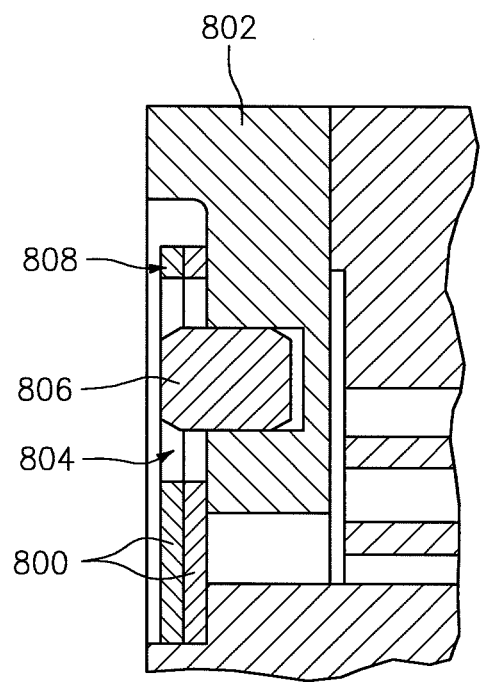
FIG. 8A is a partial side sectional illustration of another arrangement for aligning seal devices relative to another body.
Figure 8B:
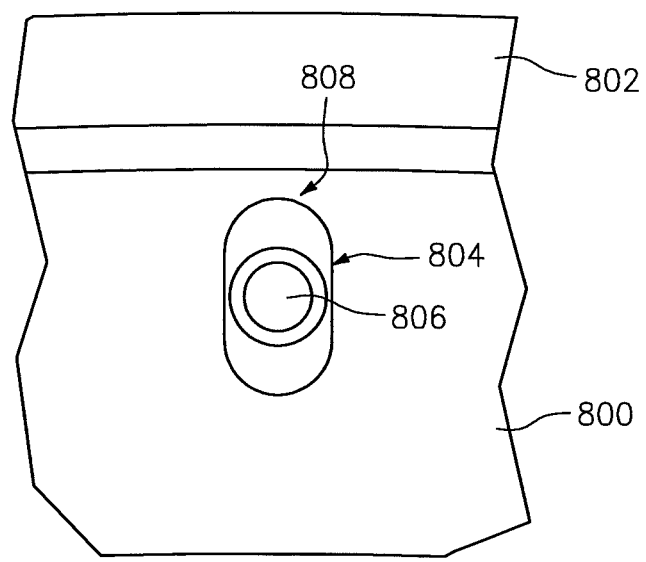
FIG. 8B is a partial end view illustration of the arrangement of FIG. 8A.

FIGS. 8A and 8B illustrates another arrangement for aligning seal devices 800 relative to another body 802. In this arrangement, the seal devices 800 include through-holes 804 which extend axially therethrough. Pins 806 mounted with the other body 802 project axially through the through-holes 804, thereby positioning the seal devices 800 relative to the other body 802. Such through-holes 804, however, may subject the seal devices 800 to relatively high stress concentrations proximate the through-holes 804, particularly in the outer region 808. Furthermore, assembly of the pins 806 with the other body 802 and/or mating the pins 806 with the through-holes 804 may be relatively difficult and time intensive, especially where there is a tight tolerance between the dimension of the through-hole 804 and the dimension of the pin 806. In contrast, the alignment tabs 104 of the present disclosure eliminate the forgoing stress concentrations as well as may simplify installation of the secondary seal devices 42 with the first ring structure 44.

Figure 9:
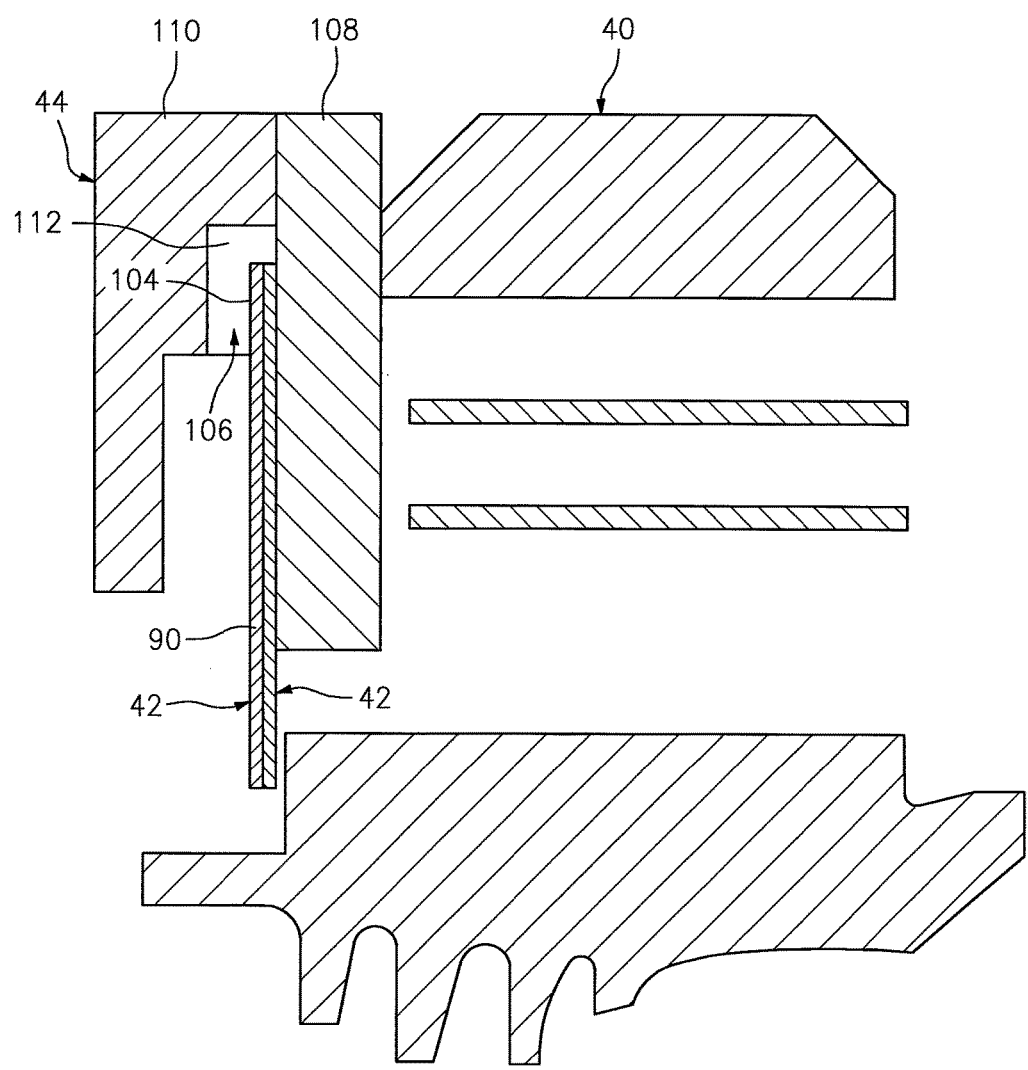
FIG. 9 is a top half side sectional illustration of another assembly for rotational equipment.

Referring to FIG. 2, the first ring structure 44 may include a secondary seal device support ring 108 and a retention ring 110. The support ring 108 is configured with an annular full hoop body, which extends circumferentially around the axially centerline 22. The support ring 108 includes the annular surface 102, and is disposed axially adjacent and engaged with the seal base 52. In the embodiment of FIG. 2, the support ring 108 also forms the apertures 106, where each of these apertures 106 extends laterally between opposing surfaces 112 (see FIG. 5A) of the support ring 108. However, in other embodiments as illustrated in FIG. 9, one or more of these apertures 106 may be formed by the retention ring 110.

Referring again to FIG. 2, the retention ring 110 is configured with an annular full hoop body, which extends circumferentially around the axially centerline 22. The retention ring 110 is disposed axially adjacent and engaged with the support ring 108, thereby capturing the stack of the secondary seal devices 42 within an annular channel formed between the rings 108 and 110. The stack of the secondary seal devices 42, of course, may also or alternatively be attached to one of the rings 108 and 110 by, for example, a press fit connection and/or otherwise. Alternatively, the retention ring 110 may be configured with another component/portion of the stator structure 24.

The present disclosure is not limited to the exemplary primary seal device 40 type or configuration described above. Various other non-contact seals are known in the art and may be reconfigured in light of the disclosure above to be included with the assembly 20 of the present disclosure. Other examples of non-contact seals are disclosed in U.S. Pat. Nos. 8,172,232; 8,002,285; 7,896,352; 7,410,173; 7,182,345; and 6,428,009, each of which is hereby incorporated herein by reference in its entirety. Similarly, the present disclosure is not limited to the exemplary secondary seal device 40 configuration described above. For example, in other embodiments, one or more of the secondary seal devices 42 may have a completely annular body, be configured as a brush seal, etc.

Figure 10:
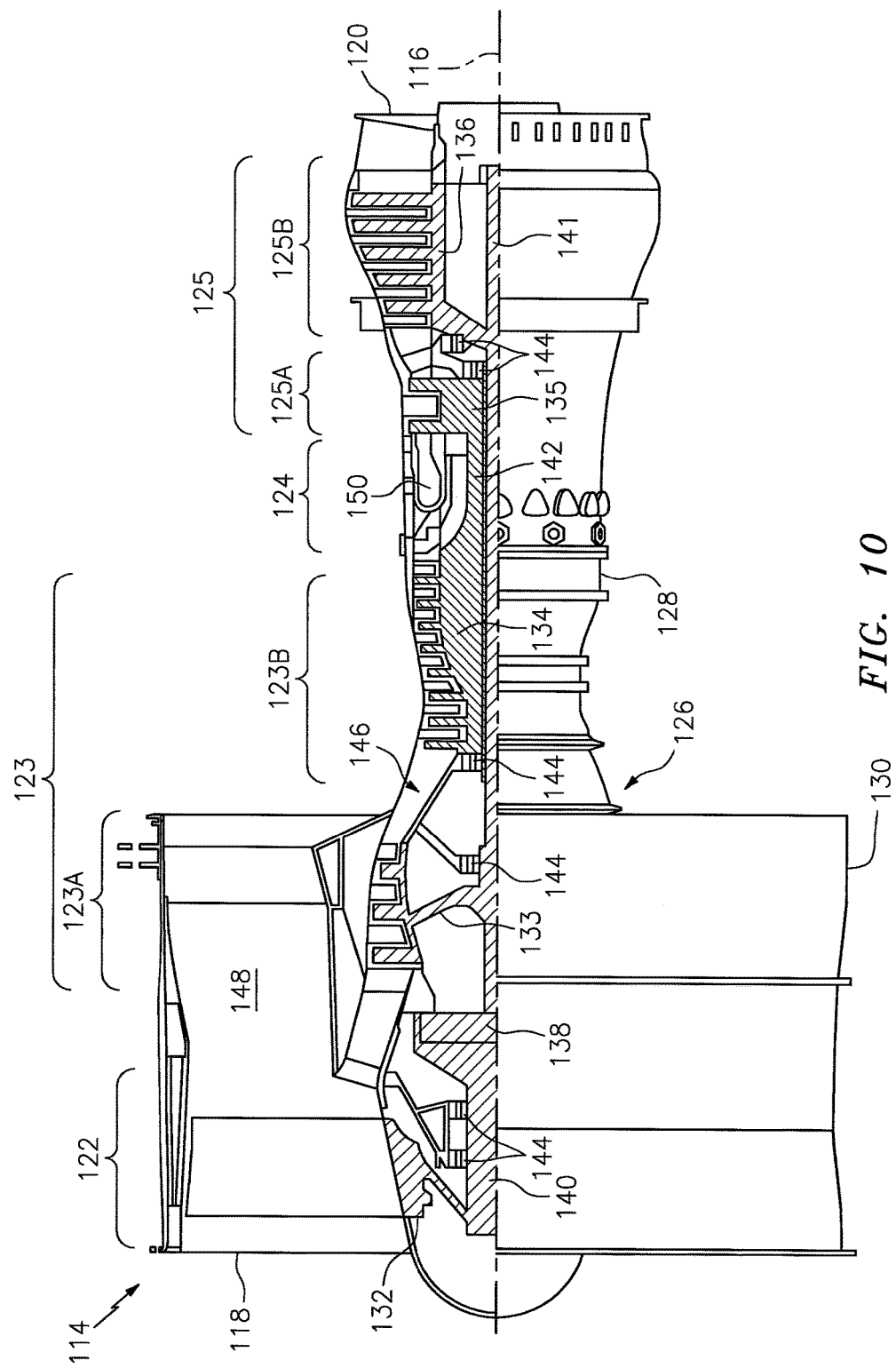
FIG. 10 is a side cutaway illustration of a gas turbine engine.

As described above, the assembly 20 of the present disclosure may be configured with various different types and configurations of rotational equipment. FIG. 10 illustrates one such type and configuration of the rotational equipment—a geared turbofan gas turbine engine 114. Such a turbine engine includes various stator structures (e.g., bearing supports, hubs, cases, etc.) as well as various rotor structures (e.g., rotor disks, shafts, etc.) as described below, where the stator structure 24 and the rotor structure 26 can respectively be configured as anyone of the foregoing structures in the turbine engine 114 of FIG. 1, or other structures not mentioned herein.

Referring still to FIG. 10, the turbine engine 114 extends along an axial centerline 116 (e.g., the centerline 22) between an upstream airflow inlet 118 and a downstream airflow exhaust 120. The turbine engine 114 includes a fan section 122, a compressor section 123, a combustor section 124 and a turbine section 125. The compressor section 123 includes a low pressure compressor (LPC) section 123A and a high pressure compressor (HPC) section 123B. The turbine section 125 includes a high pressure turbine (HPT) section 125A and a low pressure turbine (LPT) section 125B.

The engine sections 122-125 are arranged sequentially along the centerline 116 within an engine housing 126, a portion or component of which may include or be connected to the stator structure 24. This housing 126 includes an inner case 128 (e.g., a core case) and an outer case 130 (e.g., a fan case). The inner case 128 may house one or more of the engine sections 123-125; e.g., an engine core. The outer case 130 may house at least the fan section 122.

Each of the engine sections 122, 123A, 123B, 125A and 125B includes a respective rotor 132-136. Each of these rotors 132-136 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 132 is connected to a gear train 138, for example, through a fan shaft 140. The gear train 138 and the LPC rotor 133 are connected to and driven by the LPT rotor 136 through a low speed shaft 141. The HPC rotor 134 is connected to and driven by the HPT rotor 135 through a high speed shaft 142. The shafts 140-142 are rotatably supported by a plurality of bearings 144; e.g., rolling element and/or thrust bearings. Each of these bearings 144 is connected to the engine housing 126 by at least one stationary structure such as, for example, an annular support strut.

During operation, air enters the turbine engine 114 through the airflow inlet 118. This air is directed through the fan section 122 and into a core gas path 146 and a bypass gas path 148. The core gas path 146 flows sequentially through the engine sections 123A-125B. The bypass gas path 148 flows away from the fan section 122 through a bypass duct, which circumscribes and bypass the engine core. The air within the core gas path 146 may be referred to as "core air". The air within the bypass gas path 148 may be referred to as "bypass air".

The core air is compressed by the compressor rotors 133 and 134 and directed into a combustion chamber 150 of a combustor in the combustor section 124. Fuel is injected into the combustion chamber 150 and mixed with the compressed core air to provide a fuel-air mixture. This fuel air mixture is ignited and combustion products thereof flow through and sequentially cause the turbine rotors 135 and 136 to rotate. The rotation of the turbine rotors 135 and 136 respectively drive rotation of the compressor rotors 134 and 133 and, thus, compression of the air received from a core airflow inlet. The rotation of the turbine rotor 133 also drives rotation of the fan rotor 132, which propels bypass air through and out of the bypass gas path 148. The propulsion of the bypass air may account for a majority of thrust generated by the turbine engine 114, e.g., more than seventy-five percent (75%) of engine thrust. The turbine engine 114 of the present disclosure, however, is not limited to the foregoing exemplary thrust ratio.

The assembly 20 may be included in various aircraft and industrial turbine engines other than the one described above as well as in other types of rotational equipment; e.g., wind turbines, water turbines, rotary engines, etc. The assembly 20, for example, may be included in a geared turbine engine where a gear train connects one or more shafts to one or more rotors in a fan section, a compressor section and/or any other engine section. Alternatively, the assembly 20 may be included in a turbine engine configured without a gear train. The assembly 20 may be included in a geared or non-geared turbine engine configured with a single spool, with two spools (e.g., see FIG. 10), or with more than two spools. The turbine engine may be configured as a turbofan engine, a turbojet engine, a propfan engine, a pusher fan engine or any other type of turbine engine. The present invention therefore is not limited to any particular types or configurations of turbine engines or rotational equipment.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for rotational equipment with an axial centerline, the assembly comprising:
    a primary seal device configured as a hydrostatic non-contact seal device, the primary seal device including a plurality of seal shoes and a seal base, the seal shoes arranged circumferentially about the axial centerline in an annular array, and the seal base circumscribing the annular array of the seal shoes;
    a ring structure axially contacting the seal base; and
    a secondary seal device mounted with the ring structure, the secondary seal device including a seal ring body and an alignment tab, the seal ring body configured to substantially seal an annular gap between the ring structure and the seal base, and the alignment tab projecting out from the seal ring body and into an aperture in the ring structure, wherein the alignment tab is adapted to substantially rotationally locate the secondary seal device to the ring structure.

2. The assembly of claim 1, wherein the annular gap between the ring structure and the seal base is fluidly coupled with a passage that extends axially through the primary seal device.

3. The assembly of claim 2, wherein
    the primary seal device further includes a plurality of spring elements that form the passage; and each of the spring elements is radially between and connects a respective one of the seal shoes with the seal base.

4. The assembly of claim 1, wherein
the primary seal device further includes a plurality of spring elements; and
each of the spring elements is radially between and connects a respective one of the seal shoes with the seal base.

5. The assembly of claim 1, wherein
the alignment tab is a first alignment tab;
the aperture is a first aperture;
the secondary seal device further includes a second alignment tab that projects out from the seal ring body and into a second aperture in the ring structure; and
the second alignment tab is adapted to substantially rotationally locate the secondary seal device to the ring structure.

6. The assembly of claim 5, wherein the first alignment tab has a first configuration and the second alignment tab has a second configuration which is different than the first configuration.

7. The assembly of claim 5, wherein the first alignment tab has a first configuration and the second alignment tab has a second configuration which is substantially the same as the first configuration.

8. The assembly of claim 1, wherein the alignment tab projects radially out from an outer periphery of the seal ring body.

9. The assembly of claim 1, wherein the secondary seal device is configured as a split ring.

10. The assembly of claim 9, wherein
the secondary seal device includes a plurality cutouts arranged circumferentially about the axial centerline; and
a first of the cutouts extends axially through the secondary seal device and partially radially into the secondary seal device.

11. The assembly of claim 10, further comprising:
a second secondary seal device mounted with the ring structure and configured as a split ring;
wherein the cutouts are first cutouts;
wherein the second secondary seal device includes a plurality second cutouts arranged circumferentially about the axial centerline and offset from the first cutouts; and
wherein a first of the second cutouts extends axially through the second secondary seal device and partially radially into the second secondary seal device.

12. The assembly of claim 1, further comprising:
a second secondary seal device mounted with the ring structure;
the second secondary seal device including a second seal ring body and a second alignment tab;
the seal ring body and the second seal ring body configured to substantially seal the annular gap between the ring structure and the seal base; and
the second alignment tab projecting out from the second seal ring body and into the aperture in the ring structure;
wherein the second alignment tab is adapted to substantially rotationally fix the second secondary seal device to the ring structure.

13. The assembly of claim 1, further comprising:
a second secondary seal device mounted with the ring structure;
the second secondary seal device including a second seal ring body and a second alignment tab;
the seal ring body and the second seal ring body configured to substantially seal the annular gap between the ring structure and the seal base; and
the second alignment tab projecting out from the second seal ring body and into a second aperture in the ring structure;
wherein the second alignment tab is adapted to substantially rotationally fix the second secondary seal device to the ring structure.

14. The assembly of claim 1, wherein
the ring structure comprises a secondary seal device support ring and a retention ring;
the secondary seal device support ring is axially engaged with and between the seal base and the retention ring;
the retention ring is configured to axially retain the secondary seal device with the secondary seal device support ring; and
the aperture is formed in the secondary seal device support ring.

15. The assembly of claim 1, wherein
the ring structure comprises a secondary seal device support ring and a retention ring;
the secondary seal device support ring is axially engaged with and between the seal base and the retention ring;
the retention ring is configured to axially retain the secondary seal device with the secondary seal device support ring; and
the aperture is formed in the retention ring.

16. The assembly of claim 1, further comprising:
a stator structure;
a rotor structure; and
a seal assembly configured for sealing an annular gap between the stator structure and the rotor structure, the seal assembly including the primary seal device, the ring structure and the secondary seal device;
wherein the seal base is engaged with the stator structure, and the seal shoes are sealingly engaged with the rotor structure.

17. The assembly of claim 16, wherein the stator structure and the rotor structure are configured within a turbine engine.

18. An assembly for rotational equipment with an axial centerline, the assembly comprising:
a primary seal device configured as a hydrostatic non-contact seal device, the primary seal device including a plurality of seal shoes and a seal base, the seal shoes arranged circumferentially about the axial centerline in an annular array, and the seal base circumscribing the annular array of the seal shoes;
a ring structure axially contacting the seal base, the ring structure including a first surface and a second surface that laterally faces the first surface; and
a secondary seal device mounted with the ring structure, the secondary seal device including a seal ring body and an alignment tab, the seal ring body configured to substantially seal an annular gap between the ring structure and the seal base, and the alignment tab projecting out from the seal ring body and arranged circumferentially between the first surface and the second surface.

19. The assembly of claim 18, wherein the ring structure is configured with a notch that is partially formed by the first surface and the second surface.

20. An assembly for a turbine engine with an axial centerline, the assembly comprising:

a turbine engine stator structure;

a turbine engine rotor structure; and a seal assembly configured for forming a seal between the turbine engine stator structure and the turbine engine rotor structure, the seal assembly including a primary seal device, a ring structure and a secondary seal device;

the primary seal device configured as a hydrostatic non-contact seal device, the primary seal device including a plurality of seal shoes and a seal base, the seal shoes arranged circumferentially about the axial centerline in an annular array and sealingly engaged with the turbine engine rotor structure, and the seal base circumscribing the annular array of the seal shoes and engaged with the turbine engine stator structure;

the ring structure axially contacting the seal base; and the secondary seal device mounted with the ring structure, the secondary seal device including a seal ring body and an alignment tab, the seal ring body configured to substantially seal an annular gap between the ring structure and the seal base, and the alignment tab projecting out from the seal ring body and into an aperture in the ring structure.

\* \* \* \* \*

UNITED STATES PATENT AND TRADEMARK OFFICE
CERTIFICATE OF CORRECTION

PATENT NO. : 10,221,714 B2
APPLICATION NO. : 15/004556
DATED : March 5, 2019
INVENTOR(S) : Peters et al.

Page 1 of 1

It is certified that error appears in the above-identified patent and that said Letters Patent is hereby corrected as shown below:

In the Specification

Column 3, Line 41, please delete "framed" and insert --formed--.

Signed and Sealed this
Twenty-third Day of April, 2019

Andrei Iancu
*Director of the United States Patent and Trademark Office*